Figure 1:
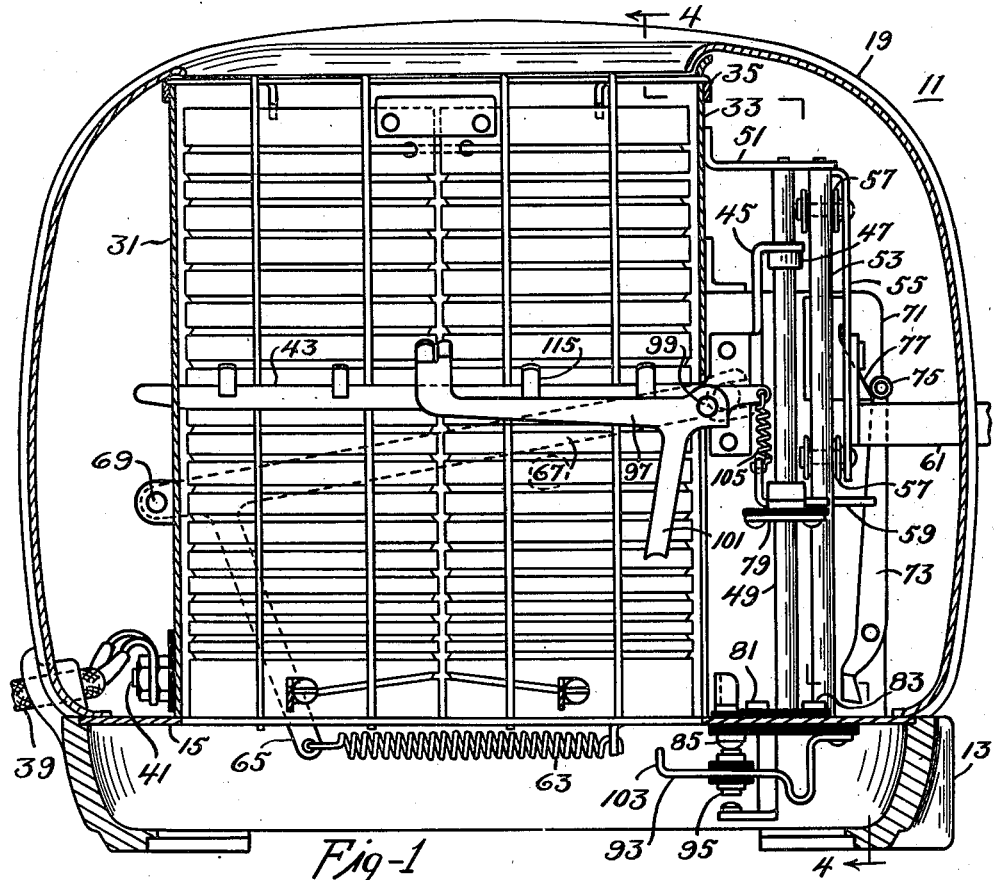

INVENTOR
MURRAY IRELAND

Jan. 6, 1942.　　　M. IRELAND　　　2,268,660
AUTOMATIC TOASTER
Filed Feb. 11, 1941　　　3 Sheets-Sheet 2

INVENTOR
MURRAY IRELAND
BY
ATTORNEY

Jan. 6, 1942.   M. IRELAND   2,268,660
AUTOMATIC TOASTER
Filed Feb. 11, 1941   3 Sheets-Sheet 3

INVENTOR
MURRAY IRELAND
BY H. M. Biefeld
ATTORNEY

Patented Jan. 6, 1942

2,268,660

UNITED STATES PATENT OFFICE 2,268,660

AUTOMATIC TOASTER

Murray Ireland, near Elgin, Ill., assignor to McGraw Electric Company, Elgin, Ill., a corporation of Delaware Application February 11, 1941, Serial No. 378,359

5 Claims. (Cl. 219—19)

My invention relates to electric cooking devices and particularly to automatic electric toasters.

An object of my invention is to provide an automatic electric toaster embodying means to permit of properly toasting a single slice of bread in a plural slice toaster.

Another object of my invention is to provide a toast heating element control means in a plural slice toaster that will effect deenergization of certain of the toast heating elements if it is desired to toast only a single slice of bread in a plural slice toaster.

Other objects of my invention will either be apparent from a description of an automatic electric toaster embodying my invention or will be pointed out hereinafter in the course of such description and set forth in the appended claims.

Figure 2:
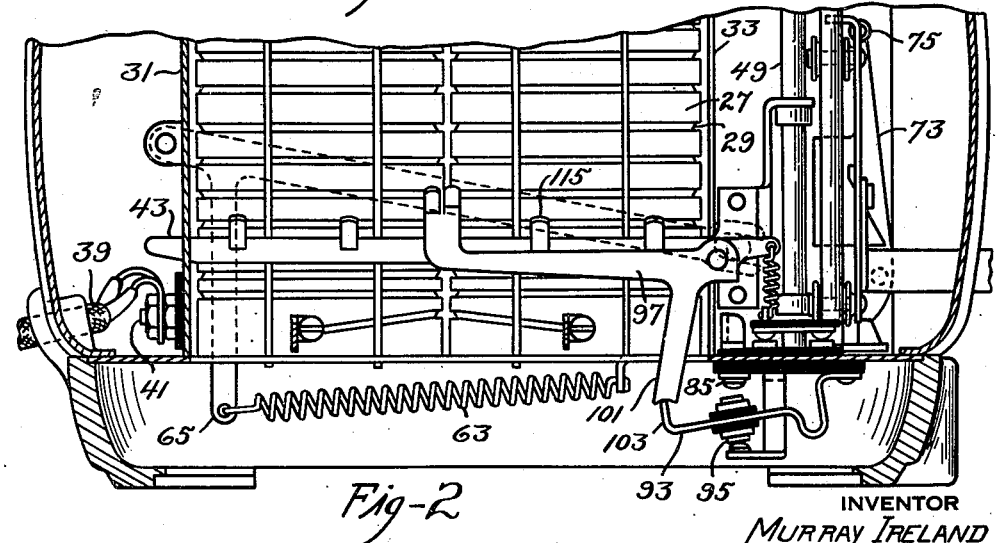
Figure 3:
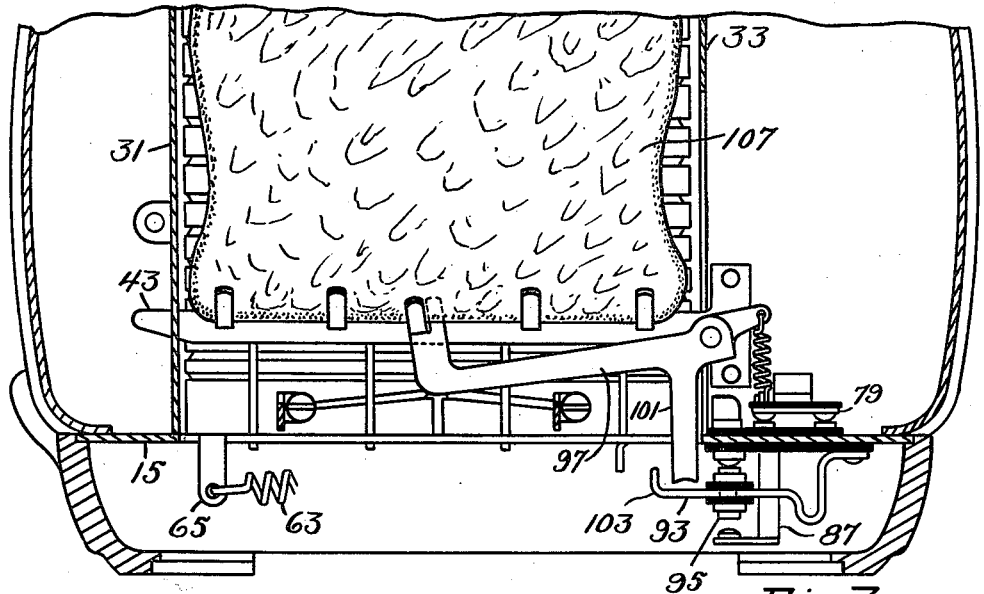
Figure 4:
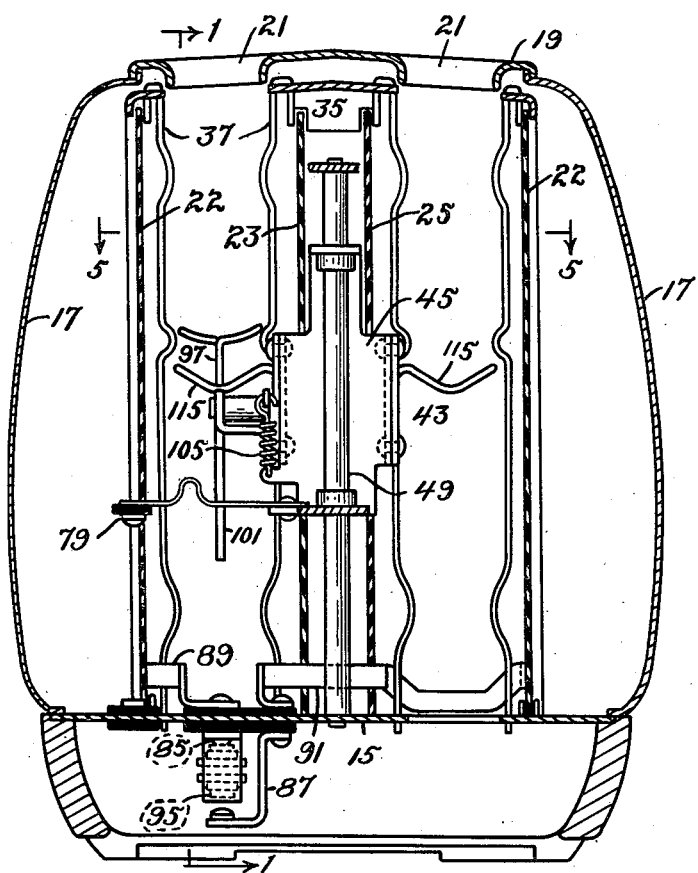
Figure 5:
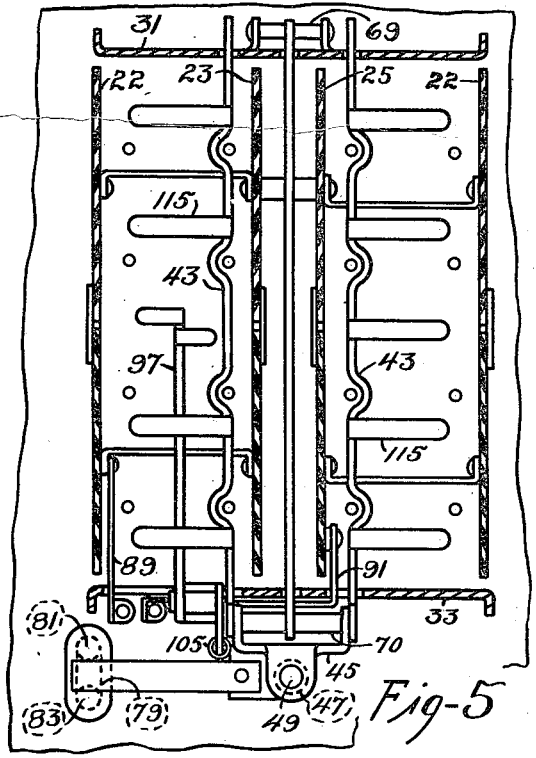
Figure 7:
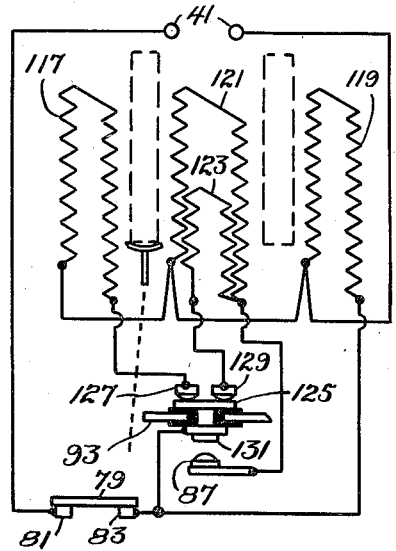
Figure 6:
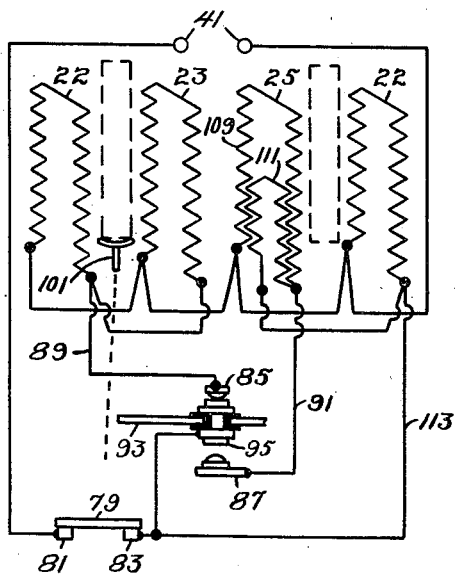
Figure 8:
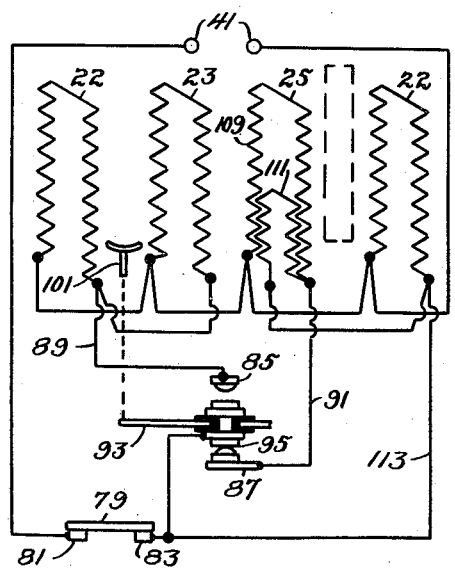

In the drawings,

Figure 1 is a vertical longitudinal sectional view through an automatic toaster embodying my invention taken on the line 1—1 of Fig. 4 and showing the parts in non-toasting position, Fig. 2 is a fragmentary view substantially the same as Fig. 1 but with the parts shown in toasting position, Fig. 3 is the same as Fig. 2 except that a slice of bread is shown in one toasting chamber, Fig. 4 is a vertical lateral sectional view taken on the line 4—4 of Fig. 1, Fig. 5 is a fragmentary view in horizontal section taken on the line 5—5 of Fig. 4, Fig. 6 is a diagram of the electrical connections of the toast heating elements when two slices of bread are being toasted at the same time, Fig. 7 is a diagram of connection similar to Fig. 6 but illustrating the use of three heating elements for a two-slice toaster, and Fig. 8 is a diagram similar to Fig. 6 but showing the connections effected when a single slice of bread only is being toasted.

I have illustrated a two-slice toaster 11 which is of generally standard design and the parts of which will be described in order to show the application thereto of my invention. The toaster 11 includes a skeleton frame 13 which may be made of moulded composition material and which has suitably secured thereto adjacent its upper surface a metal base plate 15.

I provide an outer casing for the parts of the toaster, this casing including two side walls or plates 17 and an intermediate cover 19 which may be of inverted U-shape and its edges interlocked with the engaged edges of the sides 17, as shown in Fig. 4 of the drawings. The intermediate cover member 19 is provided with a pair of elongated openings 21 through which slices of bread to be toasted can be inserted and through which pieces of toast may be removed, all in a manner well known in the art.

I prefer to provide a pair of planar vertically extending heating elements for each slice of bread to be toasted and I have shown in Figs. 4 and 5 of the drawings two outer vertical heating elements 22 and inner vertical heating elements 23 and 25. As will be hereinafter pointed out, there are slight differences in the wattage in these respective heating elements in order to obtain proper and even uniform toasting of the two surfaces of a slice of bread when toasting one slice of bread at a time or when toasting two slices of bread at the same time. The heating elements include one or more plates 27 of thin electric-insulating material such as mica having wound thereon a resistor wire or strip 29, all in a manner well known in the art.

I provide a rear intermediate wall 31 and a front intermediate wall 33 each extending vertically and having its lower edge suitably secured to the plate 15 and having its upper edge suitably interlocked with a top frame plate 35 in order to hold the front and rear intermediate walls in proper operative position. I provide also a plurality of guard wires 37 which may be suspended from the top frame plate 35 and extend through openings in the bottom plate 15 also all in a manner well known in the art. A twin conductor cord 39 may also be provided and connected to terminals 41 insulatedly mounted on the rear intermediate wall 31.

I provide also a pair of bread carriers 43 the rear end portions of which extend through a vertical slot in the rear intermediate wall 31 while the front end portions thereof extend through a vertical slot in the front intermediate wall 33 and are connected to a cross plate 45, all in a manner well known in the art. The upper and lower end portions of plate 45 are bent laterally of the main portion of the plate and have secured thereto bushings 47 which are adapted to move on a vertical standard 49 the lower end of which is suitably secured to plate 15 and the upper end of which is secured to a bracket plate 51 held by the front intermediate wall 33.

I provide further a pair of vertical standards 53, only one of which is shown in the drawings. These standards are positioned slightly in advance of standard 49 and to the right and to the left of standard 49. A carriage plate 55 is adapted to be moved vertically upwardly and downwardly between the two standards 53 being guided by upper and lower rollers 57, all in a manner well known in the art. The carriage 55 is adapted, when moved downwardly, to engage a forward bottom projection 59 of plate 45 so that downward pressure on a bar 61 or on a knob (not shown) mounted on bar 61, will cause downward movement of the two bread carriers from their upper non-toasting position shown in Fig. 1 of the drawings, to their lower toasting position as shown in Fig. 2 of the drawings.

The bread carriers are normally yieldingly biased into their upper position by a coil tension spring 63 having one end thereof secured to a lug punched out from the bottom plate 15 while the other end thereof is connected to the lower end of one arm 65 of a bell crank lever including in addition to the arm 65, a substantially horizontally extending arm 67. The arm 67 is pivotally supported as by a pin 69 supported from the rear intermediate wall 31. The forward end of arm 67 is of fork shape, as will be noted by reference to Figs. 1 and 2 of the drawings and a cross rod 70 connected to and supported by plate 45 is adapted to fit into the groove in the front fork end of arm 67. The rod 60 may also be used to secure the forward ends of the bread carriers 43 to the plate 45, as will be noted for instance by reference to Fig. 5 of the drawings.

I provide a mechanical timer 71 which may be of the type disclosed and claimed in my Patent No. 1,866,808 and which is adapted to be wound simultaneously with the downward movement of the bread carriers hereinbefore described. The casing of the timer is provided with a detent lever 73 of the kind described in my above identified patent and the portion 59 of the plate 45 secured to the carriers is adapted to fit below the lower end portion of detent lever 73 when it has been moved downwardly to hold the bread carriers in toasting position. The upper end of the detent lever 73 is provided with a roller 75 adapted to be engaged by an angularly extending surface 77 of carriage 55. When the angularly extending surface 77 has been moved into its upper position, at which time the bread carriers will be substantially in their non-toasting positions, lever arm 73 will have been moved in a direction to permit of release of the bread carriers and of the parts mechanically connected therewith so that coil spring 63 will effect quick upward movement of the bread carriers from their toasting position shown in Figs. 2 and 3 to the position shown in Fig. 1 of the drawings.

I provide a main toast heating element control switch including a contact bridging member 79 resiliently supported by the portion 59 of the plate 45 and I provide a pair of contacts 81 and 83 insulatedly mounted on the bottom plate 15 in a position to be engaged by the contact bridging member 79 when the same is moved into its lower operative position substantially as shown in Figs. 2 and 3 of the drawings.

I provide further an auxiliary toast heating element switch including two contact members 85 and 87 (see particularly Fig. 4) also insulatedly mounted on bottom plate 15. Contact member 85 is connected by a bar 89 with one terminal of the left-hand toast heating element 22 as shown more particularly in Fig. 6 of the drawings. Contact member 87 is connected by a bar 91 with one terminal of toast heating element 25. I provide further a resilient bar 93 insulatedly mounted on and supported by bottom plate 15, which bar 93 has a double ended contact 95 insulatedly mounted thereon, as will be seen in Figs. 1, 2 and 3 of the drawings. The resilient bar 93 normally yieldingly biases the upper end of contact 95 into engagement with the fixed contact member 85 but is adapted by means to be hereinafter described to be moved downwardly so that the lower end of contact member 95 will be in engagement with contact 87, as shown, for instance, in Figs. 2 and 3 of the drawings.

I provide a bell crank lever arm 97 on the left-hand bread carrier 43 pivotally supporting the same from the forward end of carrier 43 as by a pivot pin 99. The bell crank lever 97 has a relatively long arm extending substantially horizontally of and along the carrier 43 and includes a depending shorter arm 101 the lower end of which is adapted, under certain operating conditions, to engage the up-turned end 103 of bar 93 to cause the hereinbefore described change in position. I provide a small tension coil spring 105 to cause the bell crank lever 97 to normally yieldingly be held in the position shown in Figs. 1 and 2 of the drawings from which position the bell crank lever 97 will be moved to the position shown in Fig. 3 of the drawings when a slice of bread 107 has been placed on the left-hand carrier 43. It may here be pointed out that when no slice of bread is placed upon the left-hand carrier 43, the lower end of arm 101 is adapted to engage projection 103 and thereby move the auxiliary control switch into other than its normal position, whereas if a slice of bread is placed upon the left-hand carrier 43, the arm 101 will be moved out of the path of engagement with portion 103 of the resilient bar 93 so that, when the carriers have been simultaneously moved into toasting position, the auxiliary switch will remain in its normal biased position.

Reference to Fig. 6 of the drawings showing the electrical connections between the terminals 41, the toast heating elements, the main and the auxiliary heater controlling switches, will show that when the auxiliary switch is permitted to remain in its biased position in the manner hereinbefore described, all four of the toast heating elements will be properly energized to effect simultaneous proper toasting of two slices of bread. I may here point out that the resistance of one of the inner heating elements 23 is less than is the resistance of the outer heating elements 22. Further, the heating element 25 comprises a main portion 109 of relatively large resistance and an auxiliary or additional portion 111 the sum of the resistances of the portions 109 and 111 being the same as the total resistance of the heating element 23. It will be noted further that one of the contact members 83 of the main switch is connected by a conductor 113 to not only one terminal of the right-hand outer toast heating element 22, but to the outer terminal of auxiliary or additional resistor 111 of heating element 25, the other terminal of portion 111 being connected to one terminal of heating element 25.

Let it now be assumed that a slice of bread is placed on the right-hand bread carrier 43 in order to toast a single slice of bread in a two-slice toaster. When the bread carriers are moved downwardly the bell crank lever 97 responsive to the presence or the weight of a slice of bread on the left-hand carrier 43 will not be moved from the position shown in Fig. 1 of the drawings so that when the carriers are moved into their toasting position the bell crank lever 97 remaining in the position shown in Fig. 2 of the drawings will cause a change of position of the auxiliary switch including the resilient bar 93. I prefer to make the angle between the auxiliary or depending arm 101 and the main substantially horizontally extending arm less than 90°, as shown in Figs. 1, 2 and 3, in order that the pressure exerted by an operator on the knob (not shown) on the outer end of bar 61 may be used, in part, to effect movement of the bar 93 to the position shown in Fig. 2 of the drawings whereby contact member 95 is moved into operative engagement with contact 87 while at the same time the horizontal arm of bell crank lever 97 is forced against the under side of one of the laterally extending arms 115 secured to or forming an integral part of the left-hand bread carrier 43.

A consideration of Fig. 8 of the drawings will show that the left-hand outer toast heating element and its associated inner toast heating element 23 will not be traversed by any current. It will also be noted that the auxiliary resistor 111 of the right-hand inner heating element 25 is short-circuited and that current will now flow only through the main portion 109 of heating element 25. This is necessary because of the fact that when the left-hand inner toast heating element 23 as well as the left-hand outer element 22 are energized, they will have an effect upon the heating element 25 but when they are not energized, the inner heating element 25 for the single slice of bread on the right-hand carrier 43 must be energized to a greater degree and I obtain this result by short-circuiting the portion 111. The right-hand outer heating element 22 remains the same and when I refer to proper toasting in the specification and in the claims, I refer to the fact that when two slices of bread are toasted simultaneously, the resistances of the outer toast heating elements 22 are the same while the resistances of the inner toast heating elements 23 and 25 are equal to each other but are more than the resistances of the outer heating elements 22 so that the wattage translated into heat will be slightly less. When a single slice of bread is being toasted the wattage of the right-hand outer heating element 22 can remain the same but the wattage of the inner heating element being operated must be increased to a small extent.

Referring now to Fig. 7 of the drawings, I have there illustrated the application of my inventive idea to a two-slice toaster in which only three toast heating elements are utilized. The left-hand outer heating element 117 and the right-hand outer heating element 119 are identical with each other and have a certain wattage. The intermediate heating element 121 must be so designed and constructed as to translate a greater amount of electric energy into heat, that is, it will have a higher wattage. In this case also the inner toast heating means is provided with an auxiliary portion 123 which is connected in electric circuit with the main portion 121 when two slices of bread are being toasted.

The auxiliary switch including the resilient bar 93 is substantially the same. The resilient bar 93 has insulatedly mounted thereon a contact bridging member 125 above its upper surface which is adapted to normally yieldingly engage two fixed contact members 127 and 129. The bar 93 has mounted thereon a contact member 131 connected with or constituting a part of bridging member 125, this contact member 131 being adapted to engage with the lower contact member 87.

When two slices of bread are being toasted, the position of bar 93 will be that shown in Fig. 7 of the drawings and it will be noted that all of the resistance in the respective toast heating elements is traversed by an electric current in order to ensure uniform or even toasting of both sides of both slices of bread.

However, when no slice of bread is placed upon the left-hand carrier so that the position of the bell crank lever 97, when the same has been moved into toasting position, will be that shown in Fig. 2 of the drawings, contact bar 93 will be moved to its lower position where member 131 will electrically engage contact member 87 to thereby cause current to flow only through the main portion of the intermediate heater 121 as well as through the right-hand outer heater 119. This energization of the two heaters associated with the right-hand slice of bread will therefore effect uniform or even toasting of both surfaces of a slice of bread placed upon the right-hand bread carrier.

The device embodying my invention thus provides a relatively simple means actuated by the presence or absence of a piece of bread on a carrier for ensuring that the asociated toast heating elements shall be properly energized to effect uniform toasting of both surfaces of one or two slices of bread with attendant saving in energy when only a single slice of bread is to be properly toasted in a two-slice toaster.

While I have illustrated and described a single embodiment only of my invention, it is obvious that modifications may be made therein without departing from the scope of my invention and all such modifications clearly coming within the scope of the appended claims are to be considered as being covered thereby.

I claim as my invention:

1. In an automatic electric two-slice toaster comprising a plurality of electric toast heating elements, a pair of bread carriers movable simultaneously into toasting and non-toasting positions relatively to said toast heating elements and normally yieldingly biased into non-toasting position, a main switch for the toast heating elements normally yieldingly biased into open position and means to cause movement of the carriers into toasting position and to cause movement of the main switch into closed position, the improvement comprising an auxiliary heating-element control switch normally yieldingly biased into position to cause proper energization of all of said toast heating elements when said main switch has been moved into closed position and means including a lever arm pivoted on one of said carriers and actuable by the presence of a slice of bread on said one carrier into a position to avoid engagement with said auxiliary switch to ensure the maintenance of the normal position of said auxiliary switch when said carriers are moved into toasting position with a slice of bread on each carrier.

2. In an automatic electric two-slice toaster comprising a plurality of electric toast heating elements, a pair of bread carriers movable simultaneously into toasting and non-toasting positions relatively to said toast heating elements and normally yieldingly biased into non-toasting position, a main switch for the toast heating elements normally yieldingly biased into open position and means to cause movement of the carriers into toasting position and to cause movement of the main switch into closed position, the improvement comprising an auxiliary heating element control switch normally yieldingly biased into position to cause proper energization of all of said toast heating elements when said main switch has been moved into closed position and means including a lever arm pivoted on one of said carriers and actuable by the presence of a slice of bread on said one carrier into a position to avoid engagement with said auxiliary switch to ensure the maintenance of the normal position of said auxiliary switch when said carriers are moved into toasting position with a slice of bread on each carrier and to cause movement of said auxiliary switch into another position to cause proper energization of only certain of said toast heating elements to effect proper uniform toasting of a single slice of bread when both said carriers are moved into toasting position with a slice of bread on only said other carrier.

3. In an automatic electric two-slice toaster comprising a plurality of electric toast heating elements, a pair of bread carriers movable simultaneously into toasting and non-toasting positions relatively to said heating elements and normally yieldingly biased into non-toasting position, a main switch for the toast heating elements normally yieldingly biased into open position and means to move the carriers into toasting position and the switch into closed position, the improvement comprising an auxiliary toast heating element switch having two operative positions and normally yieldingly biased into position to effect proper energization of all of said toast heating elements for toasting two slices of bread at the same time when said main switch is closed, a lever arm on one of said carriers affected by the weight of a slice of bread on said one carrier and moved thereby out of position to engage said auxiliary switch to move it out of its biased position when the carriers have been moved into toasting position with a slice of bread on each carrier.

4. In an automatic electric two-slice toaster comprising a plurality of electric toast heating elements, a pair of bread carriers movable simultaneously into toasting and non-toasting positions relatively to said heating elements and normally yieldingly biased into non-toasting position, a main switch for the toast heating elements normally yieldingly biased into open position and means to move the carriers into toasting position and the switch into closed position, the improvement comprising an auxiliary toast heating element switch having two operative positions and normally yieldingly biased into position to effect proper energization of all of said toast heating elements for toasting two slices of bread at the same time when said main switch is closed, a lever arm on one of said carriers affected by the weight of a slice of bread on said one carrier and effective in the absence of a slice of bread on said one carrier to engage said auxiliary switch when the carriers have been moved into toasting position and move it into a second operative position to cause proper energization of only certain of said toast heating elements to effect uniform toasting of both sides of a slice of bread when both carriers are moved into toasting position with a slice of bread on only said other carrier.

5. In an automatic electric two-slice toaster comprising a plurality of electric toast heating elements, a pair of bread carriers movable simultaneously into toasting and non-toasting positions relatively to said heating elements and normally yieldingly biased into non-toasting position, a main switch for the toast heating elements normally yieldingly biased into open position and means to move the carriers into toasting position and the switch into closed position, the improvement comprising an auxiliary toast heating element switch having two operative positions and normally yieldingly biased into position to effect proper energization of all of said toast heating elements for toasting two slices of bread at the same time when said main switch is closed, a bell crank lever arm on one of said carriers normally yieldingly biased into a position to engage with said auxiliary switch when said carriers are moved into toasting position and movable out of the path of engagement with said auxiliary switch when said carriers are moved into toasting position with a slice of bread on said one carrier, said lever arm being adapted to engage said auxiliary switch and move it into another operative position to cause proper energization of only certain of said heating elements when said carriers are moved into toasting position with a slice of bread on only said other carrier to effect uniform toasting of both sides of said single slice of bread.

MURRAY IRELAND.